United States Patent [19]

Hart

[11] Patent Number: 5,501,512
[45] Date of Patent: Mar. 26, 1996

[54] SYSTEM AND METHOD FOR AUTOMATICALLY CALIBRATING TRANSDUCERS IN ELECTRO-PNEUMATIC FREIGHT BRAKE CONTROL SYSTEMS

[75] Inventor: James E. Hart, Trafford, Pa.

[73] Assignee: Westinghouse Air Brake Company, Wilmerding, Pa.

[21] Appl. No.: 495,278

[22] Filed: Jun. 27, 1995

[51] Int. Cl.$^6$ .................................................... B60T 13/68
[52] U.S. Cl. ........................... 303/15; 303/1; 303/DIG. 1; 303/DIG. 3
[58] Field of Search .................................... 303/15, 20, 8, 303/86, DIG. 1, DIG. 2, DIG. 3, 66, 1

[56] References Cited

U.S. PATENT DOCUMENTS

| | | | |
|---|---|---|---|
| 4,904,027 | 2/1990 | Skantar et al. | 303/15 |
| 5,090,780 | 2/1992 | Powell | 303/15 |
| 5,222,788 | 6/1993 | Dimsa et al. | 303/20 X |
| 5,393,129 | 2/1995 | Troiani et al. | 303/15 |

Primary Examiner—Douglas C. Butler
Attorney, Agent, or Firm—Gary J. Falce

[57] ABSTRACT

A system and method of calibrating pressure transducers in an electro-pneumatic brake system for a railroad train in which a locomotive microprocessor generates a respective best fit curve for the train brake pipe, supply reservoir and brake cylinder pressures that approximates the actual train pressure therefore. These best fit curves are generated from the pressure transducer readings of these pressures at each car by employing an equation based on a fourth order polynomial. Each car is then provided with a theoretical reference pressure signal from the best fit curve for each of the mentioned brake pipe, supply reservoir and brake cylinder pressures, according to the position of the car in the train. The theoretical reference signal is then compared at each car with the car pressure transducer reading for the respective brake pipe, supply reservoir and brake cylinder pressures to obtain a transducer error correction factor that remains constant through a full range of pressures. The error correction factor can be further calculated on the basis of a linear equation to obtain a variable error correction factor.

26 Claims, 5 Drawing Sheets

SYSTEM AND METHOD FOR AUTOMATICALLY CALIBRATING TRANSDUCERS IN ELECTRO-PNEUMATIC FREIGHT BRAKE CONTROL SYSTEMS

BACKGROUND OF THE INVENTION

The present invention relates to electro-pneumatic brake control systems for railroad freight trains and in particular, to microprocessor based electro-pneumatic brake control systems that employ pressure transducers for feedback in controlling operation of the individual car brakes.

Present day freight trains have a brake pipe that runs through each car and is coupled therebetween so as to extend continuously the length of the train. The brake pipe is charged with compressed air typically at the head end by a compressor on the locomotive. The compressed air not only supplies stored energy to provide the pneumatic brake force at the respective cars, but also serves as a communication link via which the car's brakes are controlled from the locomotive. Brake application and release signals are transmitted by increasing and decreasing the brake pipe pressure.

Due to the length of modern day freight trains, considerable time is required for the pneumatic control signals to propagate from the front to the rear cars of the train. This can present difficulty in controlling the train, particularly on long trains operating over undulating terrain, due to the time delay in brake response between head and rear end cars. Accordingly, microprocessor based electro-pneumatic brake control has been proposed to obtain near instantaneous brake response on all the cars of the train. Near-instantaneous remote control of the car brakes may be accomplished either by means of radio signals or by a train line wire, for example.

A microprocessor on board each railroad car receives the electrically transmitted brake control signals and operates solenoid valves that may be arranged to regulate the car brake cylinder pressure either directly or indirectly. In directly controlling the brake cylinder pressure, a reservoir charged from the train brake pipe provides a source of compressed air with which to charge the car brake cylinders via an application solenoid valve. In the indirect control arrangement, compressed air carried in the train brake pipe is exhausted locally via a solenoid valve to cause the car control valve device to operate in a well-known manner to apply the car brakes.

In either of the foregoing arrangements, near-instantaneous remote control of the car brakes is accomplished and the respective car brakes are operated concurrently. The resultant uniform brake response, therefore, has the potential to provide greatly improved train performance.

In both of the foregoing control arrangements, pneumatic pressure to electric transducers are employed to provide feedback information to the car microprocessor such that the brake response is appropriate in terms of the electrically transmitted brake control signals. It will be appreciated, therefore, that in order to realize the potential that electro-pneumatic control of a railroad freight train offers, this feedback information provided by the pressure transducers must have reasonably high accuracy. While statistically it can be expected that a fairly high percentage of these transducers will provide sufficiently accurate pressure readings, in practical terms, it can not be expected that all of such transducers will always provide such accuracy.

SUMMARY OF THE INVENTION

The main object of the present invention is to provide a calibration system for compensating pressure transducer error in a microprocessor based electro-pneumatic brake control system for railroad cars.

Another object of the invention to formulate a best fit curve that closely approximates the train brake pipe, supply reservoir and brake cylinder pressure gradients and from which a theoretical pressure is obtained at each car with which the car brake pipe, supply reservoir and brake cylinder pressure transducer feedback signals are compared to derive a respective transducer error correction factor.

Yet another object of the invention is to formulate the best fit curve in accordance with the foregoing objective in the form of a fourth order polynomial.

It is still another objective to reiteratively calculate the best fit curve disregarding any measured transducer feedback signals that differ substantially from the theoretical pressure.

It is a final object of the invention to provide a brake cylinder pressure transducer error correction factor that varies in accordance with different brake cylinder pressures.

In carrying out these objectives, there is provided a system and method for calibrating pressure transducers in an electro-pneumatic brake control system for a train of railroad cars having pneumatic and electric communication means between the train locomotive and respective cars. Microprocessor means generates a best fit curve that closely approximates the front to rear natural gradient of train pressure for at least one of the pneumatic communication means, a supply reservoir and a brake cylinder device in response to the transducer feedback signals effective at each car. A theoretical reference signal is derived for each said car corresponding to the value of the best fit curve at a point on the curve corresponding to the location of the car in the train. The theoretical reference signal for each car is compared with the corresponding feedback signal to obtain an error correction factor according to the difference therebetween when a pressure transducer is out of calibration.

BRIEF DESCRIPTION OF THE DRAWINGS

These and other objects, features, and advantages of the present invention will become apparent from the following more detailed explanation when taken conjunction with the accompanying drawings in which.

DESCRIPTION AND OPERATION

Figure 1:
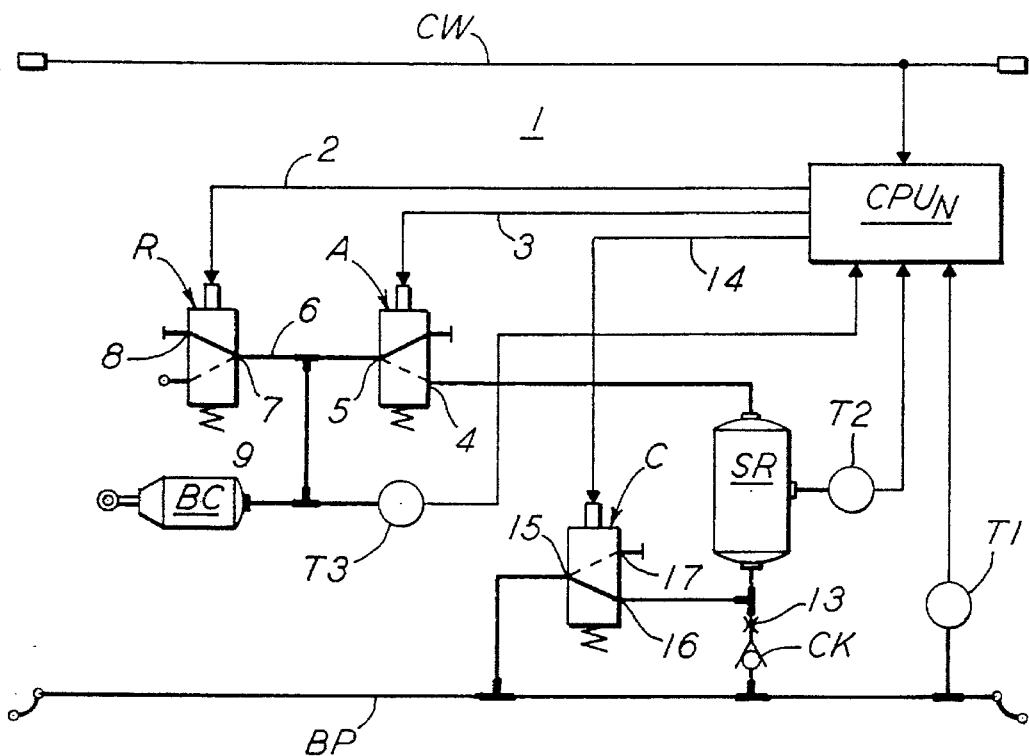
FIG. 1 is a diagrammatic view of a microprocessor based, electro-pneumatic brake control system for a railroad car.

In the environment in which the present invention is employed, as will now be explained, direct electrical control of the car brake cylinder pressure is assumed to be provided by electro-pneumatic brake control system 1 for each car N, as shown in FIG. 1. It will be understood, however, that the invention is also applicable in the environment of such electro-pneumatic brake control systems as provide indirect control of the car brake cylinder pressure, one such system being that covered in co-pending application Ser. No. 8790-N, which is therefore incorporated herein by reference.

Figure 2:
FIG. 2 is a diagrammatic view of a railroad locomotive and a plurality of railroad cars connected in a train, each having a microprocessor unit in accordance with the present invention.

In FIG. 2, there is shown a railroad train in which a string of coupled cars N is connected with a locomotive L. A brake pipe BP runs through each car and is coupled therebetween and to the locomotive to provide a pneumatic communication link therebetween. Each car N includes the electro-pneumatic brake control system of FIG. 1, while locomotive L has an active control station including an operator's brake valve device (not shown), such as the well-known industry standard 26-L type, as well as an on-board microprocessor $CPU_L$.

Referring to FIG. 1, electro-pneumatic brake control system 1 includes a control cable CW having wires via which control signals are transmitted between the cars N and locomotive L, cable CW of each car N being coupled to the cable of an adjacent car and the locomotive so as to be continuous therebetween. Alternatively, a radio communication link could be employed between the locomotive and each car. Brake control system 1 further includes a car microprocessor $CPU_N$ to which control cable CW is connected, application and release solenoid operated electro-pneumatic valves A and R that are controlled by microprocessor $CPU_N$ via wires 2 and 3; a supply air reservoir SR that is connected to brake pipe BP via a one-way check valve device CK and choke 13; and a solenoid operated, electro-pneumatic charging valve C that is controlled by microprocessor $CPU_N$ via wire 14. Charging valve C is connected at its inlet 15 to brake pipe BP and at its outlet 16 to supply reservoir SR downstream of check valve CK and choke 13. Outlet 17 of charging valve C is blanked. The inlet 4 of application valve A is connected to supply reservoir SR and its outlet 5 is connected by a pipe 6 to the inlet 7 of release valve R. The outlet 8 of release valve R is connected to atmosphere. A branch pipe 9 is connected from pipe 6 to brake cylinder device BC.

Also included in the electro-pneumatic brake control system are pressure to electric transducers T1, T2 and T3. The respective transducers provide feedback information to microprocessor $CPU_N$ via wires 10, 11 and 12 corresponding to the respective brake pipe pressure, supply reservoir pressure, and brake cylinder pressure, in order to attain effective and accurate electrical control of the car brakes. The present invention assures the accuracy of this control by automatically deriving correction factors for these pressure transducers, as will hereinafter be explained.

When it is desired to make a brake application, an electrical brake command signal COM is transmitted to each car via control cable CW. Each car microprocessor $CPU_N$ energizes its application electro-pneumatic valve A via wire 3 when this brake command signal COM exceeds the existing brake cylinder pressure at that particular car. The existing brake cylinder pressure is determined by a feedback signal $BC_F$ transmitted from transducer T3 to microprocessor $CPU_N$ via wire 11. In this energized condition of application valve A, compressed air in reservoir SR is connected to brake cylinder BC via the open application valve and pipe 9.

When brake cylinder pressure increases to the value requested by the brake command signal, microprocessor $CPU_N$ deenergizes application valve A, which is reset by its return spring to a normally closed position in which further supply of air to the brake cylinder is cut-off.

If the brake command signal COM is reduced below the brake cylinder pressure, feedback signal $BC_F$ exceeds signal COM and microprocessor $CPU_N$ responds to such disparity by energizing release valve R, which is thereby forced to its open position.

The air in brake cylinder BC is accordingly exhausted to atmosphere at a controlled rate via the open release valve until substantial equality is restored between the brake command and the effective brake cylinder pressure, at which point release valve R is deenergized. When this occurs, the release valve is reset to its normally closed position by its return spring to terminate any further exhaust of brake cylinder pressure.

Figure 3:
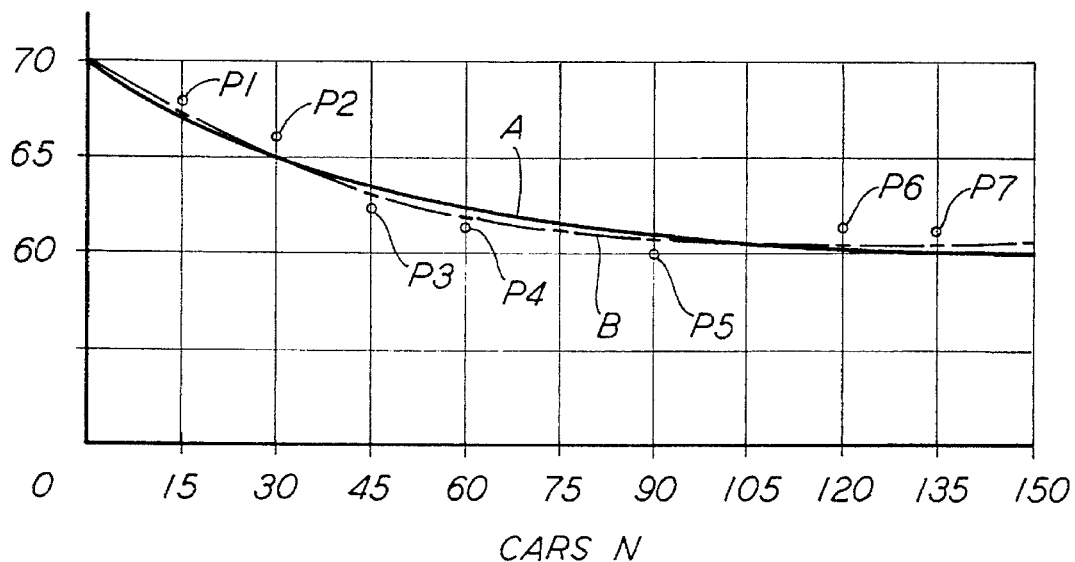
FIG. 3 is a graph showing the difference between a theoretical best fit curve generated in accordance with transducer readings of the brake pipe pressure at each car in the train of FIG. 2 and an actual brake pipe pressure curve in order to detect a transducer error.

Ideally, pressure transducers T1, T2 and T3 feed back to microprocessor $MPU_N$ electrical signals that accurately reflect the pressure in brake pipe BP, supply reservoir SR and brake cylinder BC respectively. It can be reasonably expected, however, that some transducers throughout the train may produce inaccurate feedback signals. Such inaccurate feedback signals of the brake pipe pressure generated by transducers T1, for example, are represented in the graph of FIG. 3 by points $P_1$, $P_2$, $P_3$, $P_4$, $P_5$, $P_6$ and $P_7$. It is apparent that these points deviate from an exemplary curve A that represents the brake pipe pressure effective along a 150 car train having a locomotive brake valve device set to maintain a head end pressure of 70 psi. Due to the compressibility of air and the friction of flow as the brake valve attempts to maintain the set pressure against leakage, the pressure along the brake pipe gradually decreases to a value of 60 psi at the last car, resulting in a 10 psi gradient for the exemplary curve A.

In order to compensate for any inaccurate transducer readings, and in accordance with the present invention, the transducers on each car are calibrated whenever brake pipe pressure is increased from zero psi, such as during initial charging or recharging following an emergency brake application. Such calibration will now be explained in regard to brake pipe transducers T1, T2 and T3.

Figure 4A:
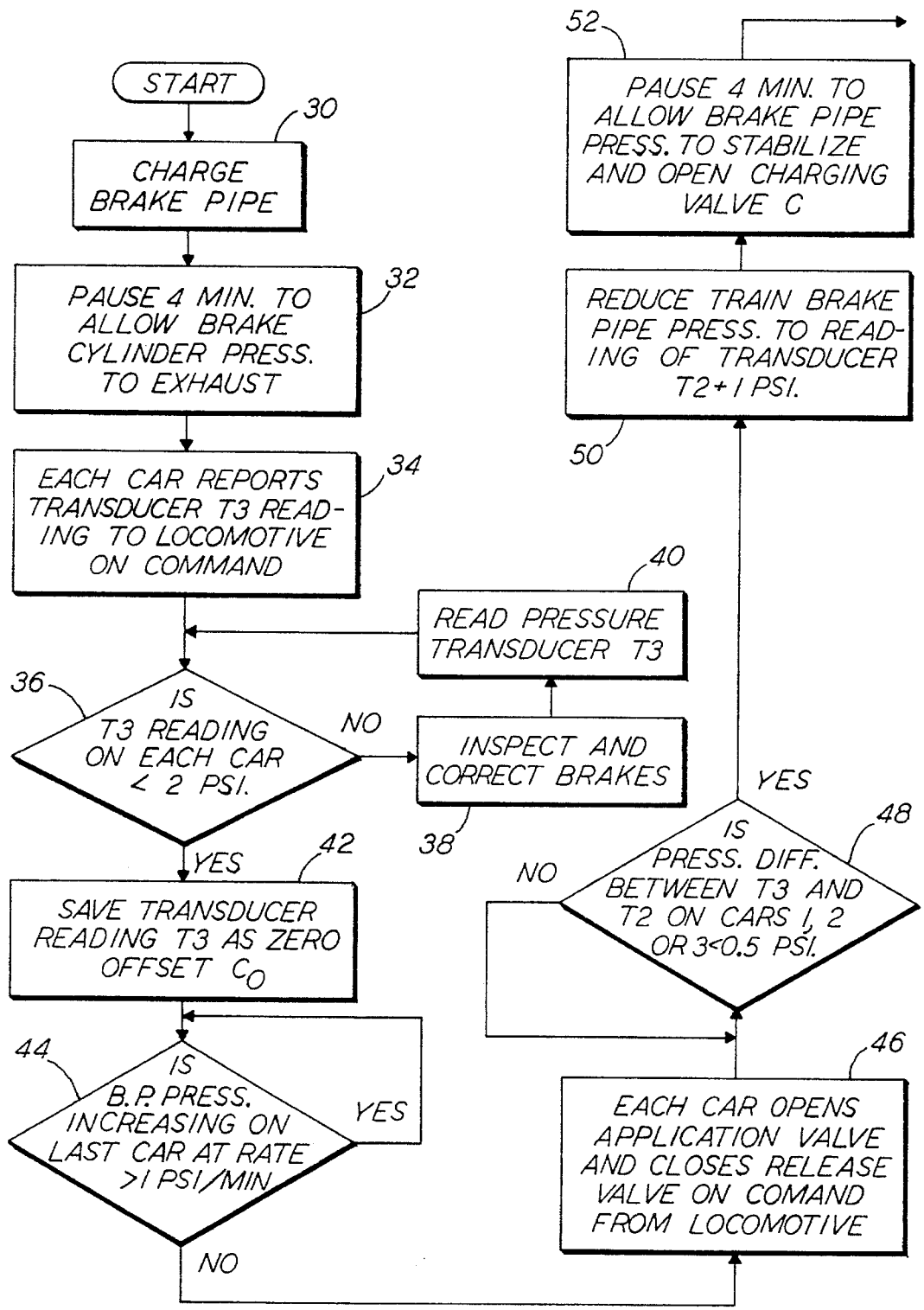
FIGS. 4A, 4B and 4C show a flowchart depicting the operating functions and sequence of such operation of the locomotive and railroad car microprocessor units.

During initial charging of brake pipe BP, supply reservoir SR is charged via check valve CK and choke 13, in bypass of normally closed charging valve C, to a value determined by the setting of the locomotive brake valve device (not shown). Concurrent with initial charging of brake pipe BP, as indicated by function block 30 in FIG. 4A, a brake release command signal COM is transmitted from the locomotive microprocessor $CPU_L$ to each car in the train via control cable CW. Microprocessor $CPU_N$ on each car operates release valve R to its open position via wire 2, thereby releasing air from brake cylinder device BC via pipe 9 and the connected inlet 7 and vented outlet of release valve R. During this venting of brake cylinder BC, application valve A is closed to cut-off supply reservoir SR from brake cylinder BC, and charging valve C remains closed.

A predetermined time delay of, for example, four (4) minutes is imposed to allow full release of the brake cylinder air, as directed by function block 32. Following this time delay, each car N is commanded via wire CW, as noted at block 34, to read and report to the locomotive the feedback signal provided by transducer T3 corresponding to the effective brake cylinder pressure.

If any car brake cylinder pressure reading exceeds a certain chosen critical value, such as 2 psi following the imposed time delay, that car is deemed to have a malfunctioning brake system that must be corrected before decision block 36 in conjunction with function blocks 38 and 40 allow the program to proceed. It will be appreciated that following the aforementioned time delay, brake cylinder pressure under normal circumstances would be expected to be less than the aforementioned critical value of 2 psi. Consequently, inability to achieve substantially complete exhaust of brake cylinder pressure within this time delay period is indicative of the need to evaluate the brake system and make appropriate repairs.

As each car brake cylinder pressure is reduced below 2 psi, its microprocessor $CPU_N$ reads and stores in memory the transducer T3 feedback signal, as indicated at function block 42. This transducer feedback signal constitutes a zero offset pressure value $C_0$, since it is referenced to zero brake cylinder pressure, and is one value used in formulating a linear equation when a subsequent high offset brake cylinder pressure value $C_1$ is derived, as will hereinafter be explained.

As indicated by the logic of decision block 44, the locomotive microprocessor monitors the rate of change of pressure in brake pipe BP at the last car to determine when the brake pipe pressure is increasing at a rate greater than 1 psi/min. when the charging rate falls below this threshold, the brake pipe BP and consequently supply reservoir SR are deemed to be sufficiently charged to achieve the calibration process.

At this point, the locomotive commands each car microprocessor $CPU_N$ via control cable CW to open application valve A and to close release valve R as indicated at decision block 46. Closure of release valve R interrupts the atmospheric connection with brake cylinder BC, while opening of application valve A connects the supply reservoir SR to brake cylinder BC to obtain pressure equalization therebetween at each car according to the slightly different brake pipe pressure effective thereat due to gradient. Only when the supply reservoir/brake cylinder pressure difference is less than 0.5 psi on the head end car, or alternatively on any one of several designated head end cars, as noted by decision block 48, does the locomotive microprocessor $CPU_L$ call for a reduction of the train brake pipe pressure to substantially match the equalization pressure at the designated head end car, and preferably 1 psi greater, as indicated at block 50. This can be accomplished by resetting the locomotive brake valve device to reduce the train brake pipe charging pressure to within 1 psi of the monitored brake cylinder/supply reservoir equalization pressure. In this manner, the equalization pressure determines the basis for a reference value with which the various transducer outputs on each car may be compared to obtain the aforementioned high pressure transducer offsets.

Figure 4B:
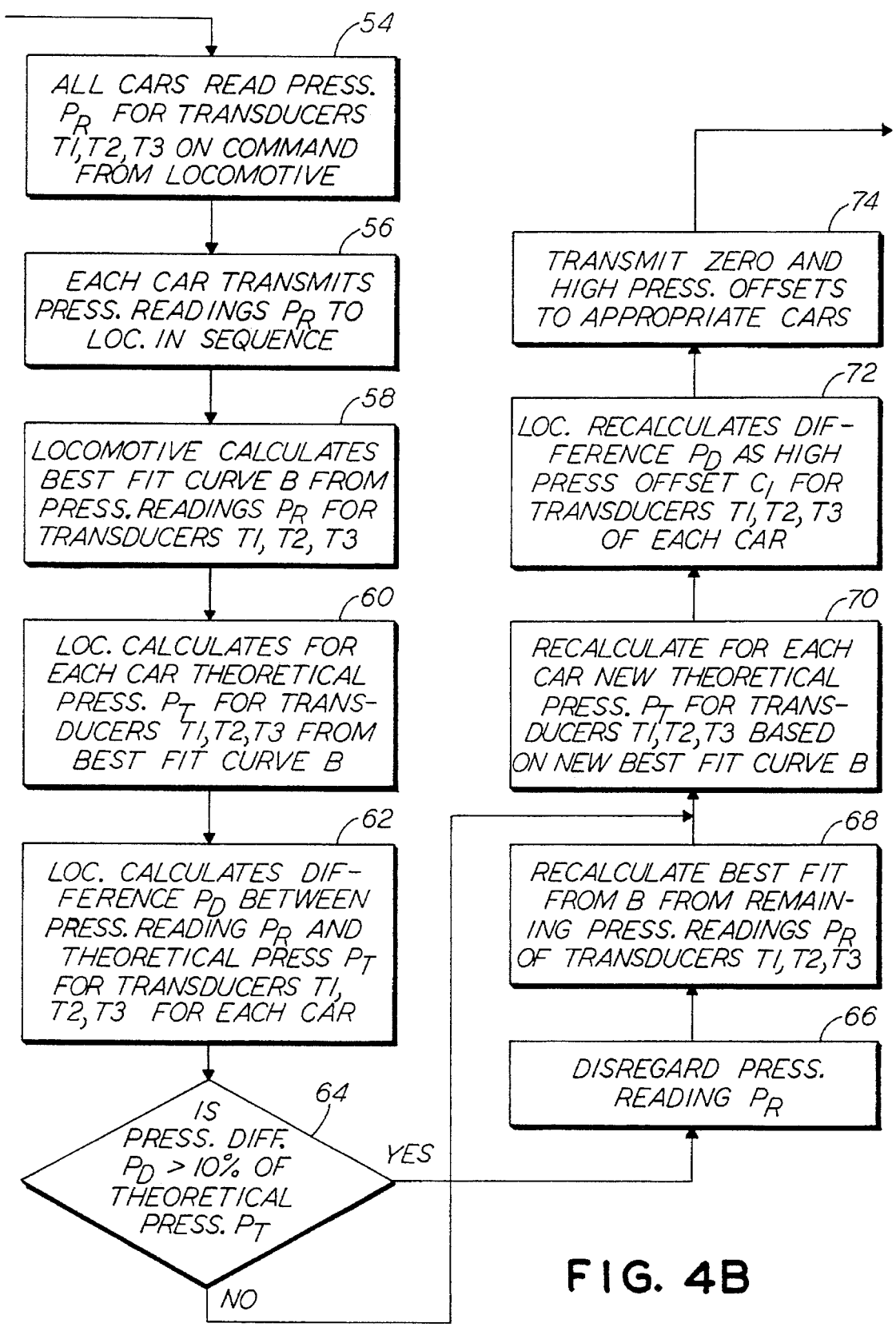

Continuing to FIG. 4B, the program proceeds at block 52 where a delay period of, for example, four minutes is required to allow the brake pipe pressure to reach its natural gradient at this reduced charging level. At this point, each car microprocessor $CPU_N$ is directed via control wire CW to open its charging valve C and thereby establish unrestricted charging communication with supply reservoir SR, which is in turn communicated with brake cylinder BC. Consequently, the brake pipe, supply reservoir and brake cylinder pressures will be substantially equalized at each car and will reflect the brake pipe pressure gradient exemplified by curve A in FIG. 3. At the same time, any brake cylinder pressure leakage is supplied via charging valve C to maintain the equalization pressure at substantially the brake pipe pressure gradient to prevent the brake cylinder pressure transducer T3 from exhibiting a false error signal due to leakage of brake cylinder pressure.

At this point, each car microprocessor $CPU_N$ is simultaneously directed by the locomotive to read its pressure transducers T1, T2 and T3 and to set the readings in memory, as indicated by function block 54. These readings are then transmitted back to the locomotive car-by-car and used to calculate a best fit curve for each train set of pressure transducers T1, T2 and T3, as indicated by function block 56 and 58. To this end, an equation based on a fourth order polynomial may be employed. This equation is of the form $P=A_o+A_1X+A_2X^2+A_3X^3+A_4X^4$ where P represents the pressure at car N. The coefficients $A_1$ can be readily derived using common regression analysis techniques. In the case of pressure transducers $T_1$, for example, if all such pressure transducers T1, were 100% accurate, the best fit curve generated would correspond precisely to exemplary curve A in FIG. 3. As shown in FIG. 3, however, several transducers T1 on various cars throughout the train have readings that deviate distinctly from a pressure corresponding to the exemplary curve A. These cars are located in the train at points $P_1$–$P_7$. Consequently, a best fit curve B in FIG. 3 may be generated from pressure transducer readings T1 on each car of the train to approximate the actual brake pipe pressure gradient represented by exemplary curve A. The car pressures calculated in deriving the best fit curve in accordance with the foregoing fourth order polynomial equation serves as a high pressure reference with which the actual pressure transducer readings at each car may be compared to detect a transducer error.

As indicated at function blocks 60 and 62, this is accomplished by calculating at the locomotive microprocessor $CPU_L$ a theoretical brake pipe pressure $P_T$ for each car from best fit curve B; and calculating the difference $P_D$ between the transducer pressure reading $P_R$ received for each car and theoretical pressure $P_T$ for a corresponding car. This difference $P_D$ represents a high pressure offset, as an indication of a transducer error.

This process of generating a best fit curve and theoretical pressure corresponding thereto for comparison with a transducer reading is done for the supply reservoir pressure transducers $T_2$ and the brake cylinder pressure transducers $T_3$ in the same manner as for the brake pipe pressure transducers $T_1$. It will be understood, however, that the best fit curve for the supply reservoir pressure and brake cylinder pressure will differ from each other and from the best fit curve B for brake pipe pressure, since it can be expected that different pressure transducers $T_2$ and $T_3$ on different cars in the train will be out of calibration.

This difference pressure $P_D$ for each set of pressure transducers P1, P2 and P3 is calculated reiteratively as indicated at blocks 64, 66, 68 70 and 72, by disregarding any pressure transducer reading $P_R$ that exceeds, say, 10% deviation from the theoretical pressure $P_T$.

The resultant zero offsets for pressure transducer T3, as well as the high pressure offsets corresponding to pressure difference $P_D$ for each of the pressure transducers T1, T2 and T3 are transmitted to the appropriate car microprocessor $CPU_N$, as indicated by block 74.

Figure 4C:
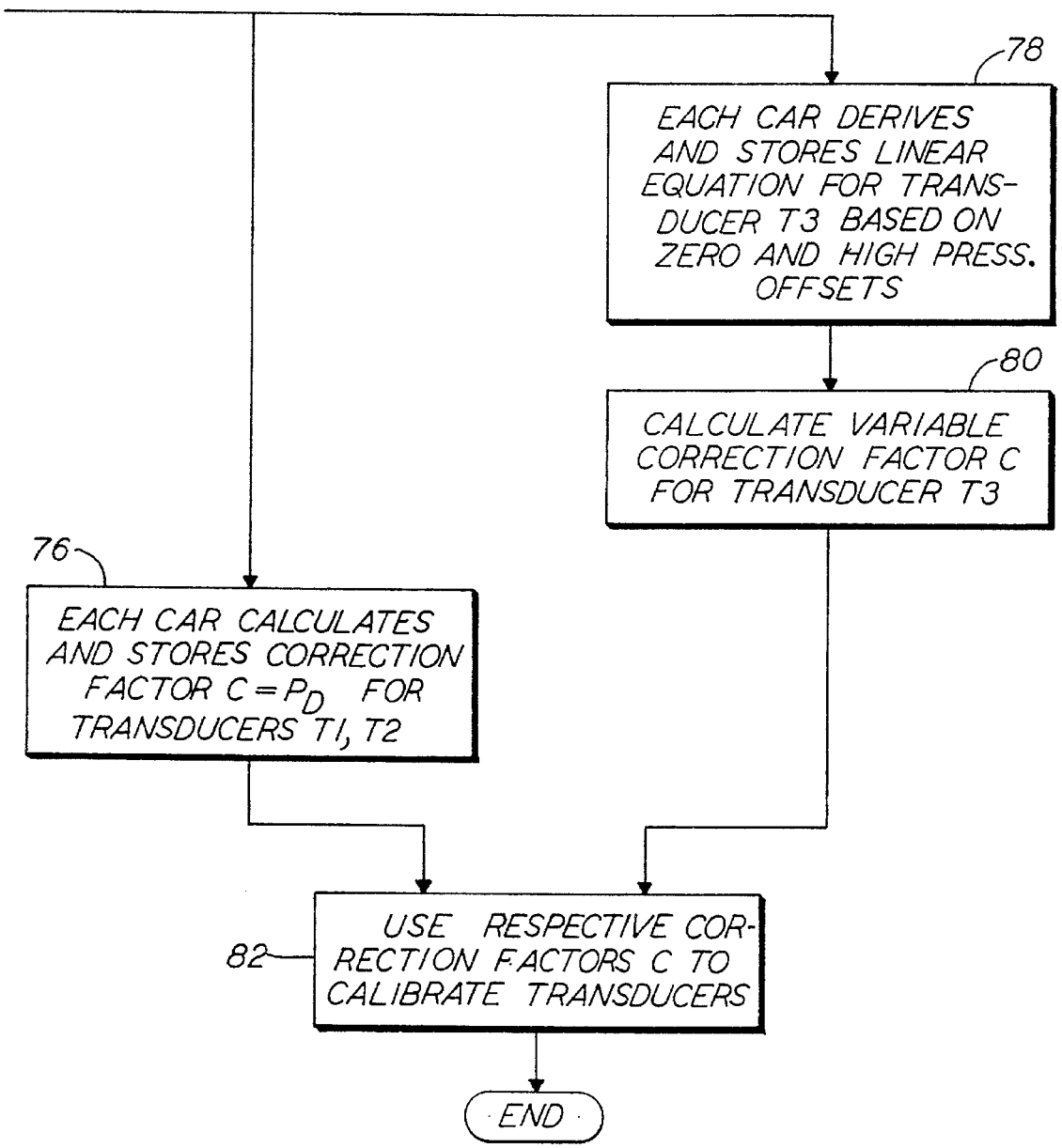

As directed by block 76, in FIG. 4C, microprocessor $CPU_N$ stores a constant correction factor C for transducers T1 and T2 corresponding to the pressure difference $P_D$. In addition, microprocessor $CPU_N$ derives and stores a linear equation based on the zero and high pressure offsets for transducer T3, as indicated at block 78; and directs block 80 to calculate from the linear equation a correction factor C for transducer T3 that varies with the effective brake cylinder pressure.

It will be appreciated from the foregoing that only a single or constant correction factor C may be desired for pressure transducers T1 and T2 for any given calibration process, such single correction factor being deemed sufficiently accurate for all pressure levels monitored by the transducers.

In the case of the pressure transducers T3, however, more precise monitoring of the brake cylinder pressure may be desired over a relatively wide range of pressures. Accordingly, the reiteratively calculated difference pressure $P_D$ corresponding to pressure transducers T3 (function block 72) are transmitted from the locomotive to each car microprocessor $CPU_N$ as a high offset pressure $C_1$, together with the previously calculated zero offset pressure $C_0$ for the respective transducers T3 (function block 42). The appropriate zero offset brake cylinder pressures $C_0$ and the relatively high offset brake cylinder pressure values $C_1$ are transmitted to each car microprocessor $CPU_N$. As indicated at function block 78, a linear equation is derived from these zero and high pressure offsets, as follows:

$$C = P_R \frac{(C_1 - C_0)}{P_T} + C_0$$

where:

C=pressure correction factor $P_R$=transducer pressure reading $C_0$=pressure offset from zero pressure $P_T$=theoretical reference pressure $C_1$=pressure offset from $P_T$.

Figure 5:
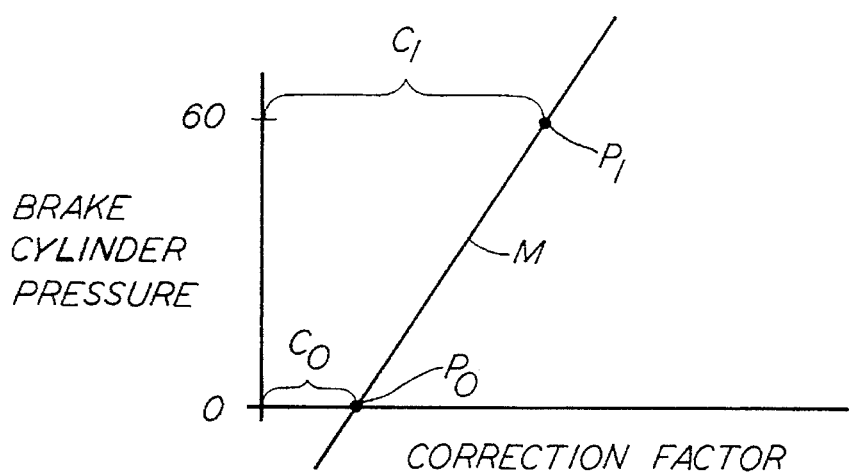
FIG. 5 is a graph showing a linear curve in accordance with which a variable transducer correction factor is derived for different brake cylinder pressures.

It will now be understood that depending on the brake cylinder pressure $P_1$ to be monitored by transducers T3, a variable correction factor C is provided, as indicated at function block 80. It can be seen from the graph of FIG. 5, for example, that the slope of a straight line M between an offset $C_0$ taken at zero brake cylinder pressure (equalization) varies depending upon the different offset pressures. The slope of this line M thus represents the proportion by which correction factor C varies with different brake cylinder pressures.

Having determined any inaccurate transducers T1, T2 and T3 and the correction factors C required to compensate such transducer feedback signals at the car microprocessor $CPU_N$, as indicated at function block 82, it will now be understood that operation of the application valve A and release valve R can be accurately controlled to provide electronic braking in accordance with the brake command signal COM transmitted from the locomotive to each car via control cable CW.

I claim:

1. A system for calibrating pressure transducers in an electro-pneumatic brake control system for a train of railroad cars having pneumatic and electric communication means between the train locomotive and respective cars, each car having in addition to said pneumatic communication means, a supply reservoir connected to said pneumatic communication means and a brake cylinder device connected to said supply reservoir, said calibration system comprising:

a. pressure transducer means for providing a feedback signal according to the pressure of at least one of said pneumatic communication means, said supply reservoir and said brake cylinder device at each said car;

b. means for calculating a mathematical best fit curve that closely approximates the actual natural gradient of train pressure for said at least one of said pneumatic communication means, said supply reservoir and said brake cylinder device in accordance with corresponding ones of said transducer feedback signals being connected to said microprocessor means;

c. means for deriving from said best fit curve a theoretical reference pressure value for each said car depending on its location in said train; and d. means for determining a difference between said theoretical reference value and said transducer feedback signal corresponding thereto for each said car to use as a transducer error correction factor.

2. A transducer calibration system as recited in claim 1, wherein said transducer error correction factor is constant for any fluid pressure of said at least one of said pneumatic communication means, said supply reservoirs and said brake cylinder devices.

3. A transducer calibration system as recited in claim 1, wherein said transducer error correction factor is variable according to the fluid pressure effective at different cars for said at least one of said pneumatic communication means, said supply reservoirs and said brake cylinder devices.

4. A transducer calibration system as recited in claim 1, wherein said mathematical best fit curve is generated for each of said pneumatic communication means, said supply reservoir and said brake cylinder pressures for said train.

5. A transducer calibration system as recited in claim 1, wherein said best fit curve is generated reiteratively when the difference between said theoretical reference value and said transducer feedback signal corresponding thereto is greater than a predetermined percentage of said theoretical reference value.

6. A transducer calibration system as recited in claim 4, wherein said means for generating said best fit curve effects pressure equalization between said pneumatic communication means, said supply reservoir and said brake cylinder device on each said car when said pneumatic communication means is substantially charged, said equalization pressure at each said car providing the basis on which said best fit curve is generated according to a fourth order polynomial.

7. A transducer calibration system as recited in claim 6, further comprising:

a. an application valve between said supply reservoir and said brake cylinder device having an open position in which fluid pressure communication therebetween is established when said pneumatic communication means is substantially charged; and b. choke means between said pneumatic communication means and said supply reservoir for charging said supply reservoir to the pressure of said pneumatic communication means.

8. A transducer calibration system as recited in claim 7, further comprising means for sensing substantial pressure equalization between said supply reservoir and said brake cylinder device at a preselected car, and accordingly commanding a reduction of the pressure in said pneumatic communication means to within a predetermined value of said equalization pressure effective at said preselected car to provide pressure equalization between the reduced pressure of said pneumatic communication means, and the equalized pressure of said supply reservoir and said brake cylinder device.

9. A transducer calibration system as recited in claim 8, further comprising a charging valve between said pneumatic communication means and said supply reservoir in parallel with said choke means, said charging valve being operated to an open position following said pressure equalization between said pneumatic communication means, said supply reservoir and said brake cylinder device.

10. A transducer calibration system as recited in claim 6, further comprising a release valve having an open position in which said brake cylinder device is vented to atmosphere, and said application valve having a closed position in which fluid pressure communication between said supply reservoir and said brake cylinder device is interrupted, during said charging of said pneumatic communication means, whereby said pressure transducer feedback signal corresponding to said brake cylinder device represents a zero pressure offset value.

11. A transducer calibration system as recited in claim 10, wherein said zero pressure offset value and said error correction factor for said brake cylinder pressure transducer are used to calculate a variable error correction factor according to the following linear equation:

$$C = P_R \frac{(C_1 - C_0)}{P_T} + C_0$$

where:

C=pressure correction factor $P_R$=transducer pressure reading $C_0$=zero pressure offset $P_T$=theoretical reference pressure $C_1$=pressure offset from $P_T$.

12. A method of calibrating pressure transducers in an electro-pneumatic brake control system for a railroad train having pneumatic and electric communication means extending from the train locomotive through each car thereof, said locomotive and said cars having microprocessor means to which said electric communication means is connected, each said car further having a supply reservoir connected to said pneumatic communication means, a brake cylinder device connected to said supply reservoir and pressure transducers providing electric feedback signals to said car microprocessor means corresponding to the fluid pressure effective at said pneumatic communication means, said supply reservoir and said brake cylinder device, comprising the steps of:

a. charging said pneumatic communication means;

b. connecting said supply reservoir with said pneumatic communication means;

c. establishing fluid pressure communication between said supply reservoir and said brake cylinder device prior to said pneumatic communication means being fully charged;

d. detecting at a preselected one of said cars substantial pressure equalization between said supply reservoir and said brake cylinder device thereof;

e. reducing the pressure of said pneumatic communication means to a value corresponding substantially to the equalization pressure of said supply reservoir and said brake cylinder device to obtain substantial pressure equalization therewith;

f. calculating from said transducer feedback signals effective at respective ones of said cars a best fit curve for at least one of said pneumatic communication means, said supply reservoir and said brake cylinder device, said best fit curve approximating the natural train pressure gradient therefor;

g. deriving from said best fit curve a theoretical reference value for each car depending on its location in said train; and h. detecting a deviation between said theoretical reference value and said transducer feedback signal corresponding thereto for each said car to derive a transducer error correction factor.

13. The method as recited in claim 12, wherein said supply reservoir is connected with said pneumatic communication means via a choke.

14. The method as recited in claim 13, further comprising the step of connecting said supply reservoir with said pneumatic communication means in bypass of said choke following said reduction of the pressure of said pneumatic communication means when pressure equalization between said supply reservoir and said brake cylinder device is detected.

15. The method as recited in claim 12, further comprising the step of determining said substantial pressure equalization between said supply reservoir and said brake cylinder device in accordance with the difference between said feedback signals of said transducers corresponding thereto being less than a predetermined value.

16. The method as recited in claim 15, wherein said predetermined value is 0.5 psi.

17. The method as recited in claim 12, wherein the pressure of said pneumatic communication means is reduced to within a predetermined value of said equalization pressure effective at said supply reservoir.

18. The method as recited in claim 17, wherein said predetermined value is 1.0 psi.

19. The method as recited in claim 12, further comprising the steps of:

a. detecting a difference between said theoretical reference value and said transducer feedback signal corresponding thereto; and b. reiterating steps (f), (g) and (h) of claim 10 disregarding any such pressure transducer feedback signal when the difference between said feedback signal and said corresponding theoretical reference value exceeds a predetermined amount.

20. The method as recited in claim 19, wherein said predetermined amount is 10 percent of said theoretical reference value.

21. The method as recited in claim 12, wherein said transducer error correction factor is constant for any pressure of said at least one of said pneumatic communication means, said supply reservoir and said brake cylinder device.

22. The method as recited in claim 12, wherein said at least one of said pneumatic communication means, said supply reservoir and said brake cylinder device is said brake cylinder device.

23. The method as recited in claim 22, further comprising the steps of:

a. releasing fluid under pressure from said brake cylinder device during said charging of said pneumatic communication means prior to said fluid pressure communication being established between said supply reservoir and said brake cylinder device;

b. detecting substantially complete exhaust of said brake cylinder fluid under pressure;

c. providing a zero offset value according to the difference between said transducer feedback signal corresponding to said brake cylinder device and zero psi;

d. calculating a linear equation in accordance with said zero offset value and said error correction factor for said brake cylinder pressure transducer at each said car; and e. deriving from said linear equation a variable error correction factor.

24. The method as recited in claim 23, wherein said linear equation is as follows:

$$C = P_R \frac{(C_1 - C_0)}{P_T} + C_0$$

where:
- C=pressure correction factor
- $P_R$=transducer pressure reading
- $C_0$=zero pressure offset
- $P_T$=theoretical reference pressure
- $C_1$=pressure offset from $P_T$.

25. The method as recited in claim 23, wherein said transducer error correction factor is constant for any pressure of said at least one of said pneumatic communication means and said supply reservoir.

26. The method as recited in claim 22, further comprising the steps of:
   a. providing a predetermined delay period following commencement of said release of fluid under pressure from said brake cylinder device;
   b. monitoring each said car brake cylinder pressure following expiration of said delay period; and
   c. determining a faulty brake system when said brake cylinder pressure is greater than a predetermined critical value.

* * * * *